INVENTOR
RICHARD N. SARNS
BY
Barnes, Kisselle, Raisch & Choate
ATTORNEYS

United States Patent Office 3,394,954
Patented July 30, 1968

3,394,954
TUBE COUPLING FOR MEDICAL APPLIANCES
Richard N. Sarns, Ann Arbor, Mich., assignor to Sarns, Inc., Ann Arbor, Mich., a corporation of Michigan
Filed May 6, 1966, Ser. No. 548,152
3 Claims. (Cl. 285—319)

ABSTRACT OF THE DISCLOSURE

This invention relates to an improved and substantially simplified design of a tube coupling device for medical appliances. In this invention a first molded plastic tube connector having an axial bore telescopically engages an end of a second tube connector having axially extending flexible arms with an integral fulcrum, positioned to engage a central portion of one of the connectors with the arms being radially spaced with respect to the central portion. One end of the arm overlies and engages a portion of the other connector in one position to prevent axial disengagement of the connectors and the arms and integral fulcrums are flexible to move radially outward to a disengaging position.

Background of the invention

This invention relates to an improved device for coupling conduits in medical appliances. In brief, this invention comprises male and female slidingly engageable couplers having a selectively disengageable latch arrangement to prevent accidental disengagement of the couplers. The latch mechanism consists of axially extending arms having an integral fulcrum with the arms being biased toward the engaged position by the inherent resiliency of the plastic material from which the integral arms and fulcrums are formed. In the preferred embodiment of this invention the arms and fulcrums are also an integral portion of one of the coupler elements. This invention also provides a quick-change coupler so that the tubes to which it is attached can be rapidly connected and disconnected. In many situations, such as blood transfusions, heart operations and treatments involving the functioning of the kidneys, there are many times when emergency action or rapid connection of devices utilizing incoming and outgoing bodily fluids is of the utmost importance.

This invention relates to a tube coupling for medical appliances.

It is an object of the present invention to provide a device which can be utilized in hospital functions and of such a nature that it can be readily sterilized and maintained in a sterile condition.

It is also an object to provide a coupling unit which is of molded plastic and thus inexpensive enough to permit expendability. Another object is the use of the inherent resiliency of the plastic to obtain the engagement and disengagement function.

Reference is made to United States patents to Mullenux, No. 1,284,332, dated July 12, 1921 and to Koenig, No. 1,203,630, dated Nov. 7, 1916.

It is also an object to provide a device which can be readily attached to the end of tubes and a device which permits tubes to be easily and rapidly connected and disconnected in a tight liquid and airproof joint.

It is a further object to provide a union which is extremely compact with no outward projections and which visibly indicates a good connection at a glance, and which can be readily disconnected by a slight finger pressure easily applied by a nurse or assisting technician.

Other objects and features of the invention relating to details of construction and operation will be apparent in the following specification directed to the manner of making and using the devices and setting forth the best mode contemplated for carrying out the invention.

Figure 1:
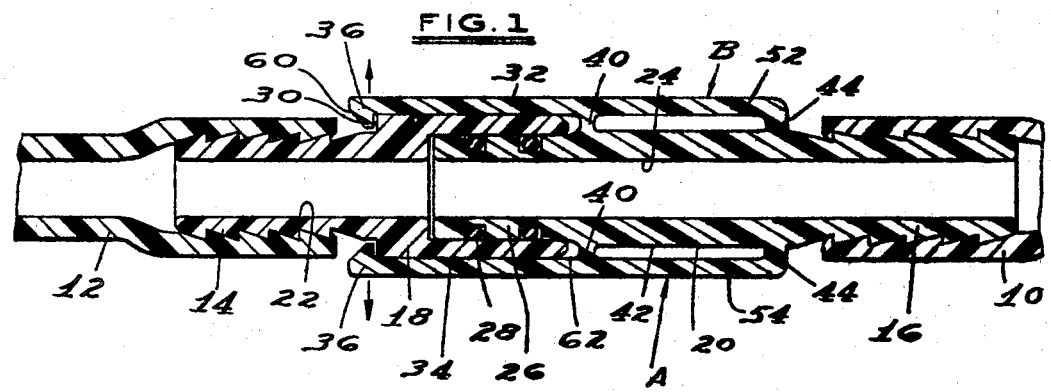

Drawings accompany the disclosure and the various views thereof may be briefly described as:

FIGURE 1, a sectional view longitudinally of the joint showing the respective parts in assembly.

Figure 2:
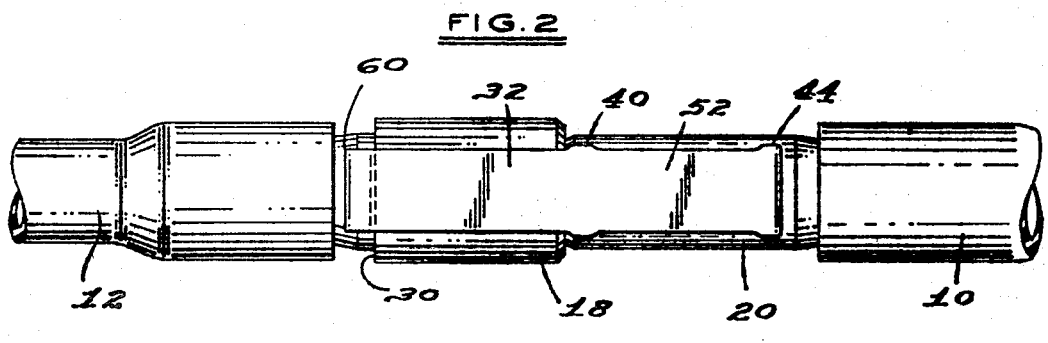

FIGURE 2, an outside elevation of the device rotated 90° from the position shown in FIGURE 1 to further illustrate the parts.

Figure 3:
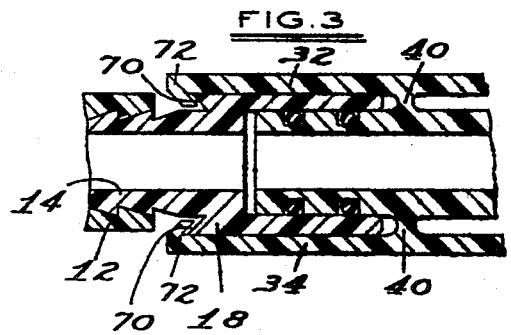

FIGURE 3, a detailed view of a preferred construction for interlock.

Referring to the drawings:

Two plastic or rubber tubes 10 and 12 coming from the left and right of the drawing are shown connected to the respective nipple ends 14 and 16 of telescoping connection devices 18 and 20. The tubes 10 and 12 are preferably formed of a transparent plastic which will permit ready observation of fluid flow. The ends 14 and 16 are provided with annular grooves which create a saw tooth section so that the soft plastic will engage firmly. The outer telescoping union member 18 has an internal diameter 22 substantially equal to the inner diameter of the tube 12 and substantially equal to the internal diameter 24 of the section 20 of the joint.

The enlarged telescoping portion 18 has a cylindrical recess for receiving the end 26 of the element 20, this latter end having parallel grooves and suitable O-rings 28 contained therein for forming a tight air and fluid seal with the internal diameter of the element 18. Where the nipple portion 14 joins the element 18, there is a sharp annular shoulder 30 which cooperates with two parallel arms 32 and 34 each of which has at a distal end a latch projection 36. These arms are mounted, in the embodiment shown, on integral projections 40 and 44 and spaced from the outer surface 42 of element 20. The extension portions of the arms 34 can be designated 52 and 54. It is preferable that the arms 32, 34 and the projections 40, 44 be molded integrally with coupling element 20.

In the assembly shown in FIGURE 1, it will be seen that the coupling device is locked together by reason of the latch projections 36 being positioned behind the annular shoulder 30. It is possible, however, to move these latch projections 36 to a release position by pressure applied at A and B against the portions 52 and 54 which are spaced from the outer diameter of the section 20. This pressure causes the arms 32, 34 to fulcrum at the projections 40 and lifts the latch projections 26 radially outward to clear the shoulder 30. In this position, the coupling can be readily uncoupled by withdrawing the section 26 from the recess in section 18.

In assembly, the two elements of the coupling will move together without any special application of pressure since the angled ends 60 on the latch projections 36 will cam over the annular angled surface 62 at the end of the body 18. Thus, the joint may be rapidly pushed together and the portion 26 of the section 20 will move directly into its proper recess while the arms 32 flex sufficiently to allow the latch projections 36 to reach and fall in place behind the annular shoulder 30.

In FIGURE 3, there is detailed a preferred structure at the latching area showing an undercut shoulder 70 angled inwardly to cooperate with inwardly angled latch projections 72. This construction cooperates with the projections 40 which limit the relative axial movement of the assembly in the engagement direction. The parts move together and seal as soon as the O-rings 28 are received in the bore of member 18. When the latch projections snap over the shoulder 70, the projection 40 is approaching the end 62 of the body 18. This insures fairly close positioning of the latch projections 72 relative to the shoulder 70. Thus, any pull or tension tending to disengage the parts will cause the projections 72 to cam into the re-entrant surface 70, drawing the arms 32, 34 inwardly. When disengagement is intended, however, the parts can be shifted to the full degree of engagement and latch projections 72 are then cleared from shoulder 70 to an easily releasable position as previously described.

There is thus described a quick coupling unit which is easily cleaned and can be autoclaved maintaining the necessary sterile conditions. The device can also be readily observed as engaged by a glance and can be quickly engaged or disengaged by the simple expedient of a push-on connection or a pull disconnection with pressure at points A and B. Thus, threaded joints and stainless steel metal structures can be completely avoided in the operating room. The device is also of sufficiently simple and inexpensive design and construction that the joints could be made to be expendable once they have functioned in a particular operative use.

In addition, the device is such that it locks into position when there is any tension applied to the joint which might tend to separate the parts. Also, the O-ring joint between the telescoping parts adds a friction component helping to control the engagement.

What is claimed as new is as follows:

1. For use in medical appliances and the like, a coupling for flexible tubing which comprises:
   (a) a first molded palstic tube connector having one end to engage the end of a tube and the other end shaped with an axial bore,
   (b) a second molded plastic tube connector having one end to engage the end of a tube and another end to telescopically engage with the bore of the first connector in sealing relation thereto,
   (c) a central body portion integral therewith and interposed between the two ends of one of the connectors,
   (d) at least one axially extending flexible plastic arm having two axially spaced fulcrums which are integral with an arm and engage the central body portion with at least one of the fulcrums being positioned between the extremities of an arm and the arm being radially spaced from the outer surface of the central body portion and extending axially to overlie a portion of the other connector in assembly, means to axially secure the arm to the central body portion, and
   (e) engaging means at the overlying end of the arm to mechanically engage a portion of the other connector in assembly in one position to prevent axial disengagement of the connectors, the arm and its fulcrums being flexible to move the engaging means radially outward within the inherent resiliency of the arm and integral fulcrums to a disengaging position when a radially inward pressure is applied to the arm in the area between the end of the arm opposite the engaging means and the integral fulcrum between the extremities of the arm and adjacent to the engaging means.

2. For use in medical appliances and the like, a coupling for flexible tubing which comprises:
   (a) a first molded plastic tube connector having one end to engage the end of a tube and the other end shaped with an axial bore,
   (b) a second molded plastic tube connector having one end to engage the end of a tube and another end to telescopically engage with the bore of the first connector in sealing relation thereto,
   (c) a central body portion integral therewith and interposed between the two ends of one of the connectors,
   (d) at least one axially extending flexible plastic arm having two axially spaced fulcrums which are integral with both the arm and the central body portion with the arm being radially spaced from the outer surface of the central body portion and extending axially to overlie a portion of the other connector in assembly, and
   (e) engaging means at the overlying end of the arm to mechanically engage a portion of the other connector in one position to prevent axial disengagement of the connectors, the arm and fulcrums being flexible to move the engaging means radially outward within the inherent resiliency of the arm and integral fulcrums to a disengaging position when pressure is applied radially inward on the portion of the arm between the fulcrums.

3. For use in medical appliances and the like, a coupling for flexible tubing which comprises:
   (a) a first molded plastic tube connector having one end to engage the end of a tube and the other end shaped with an axial bore,
   (b) a second molded plastic tube connector having one end to engage the end of a tube and another end to telescopically engage with the bore of the first connector in sealing relation thereto,
   (c) a central body portion integral therewith and interposed between the two ends of one of the connectors,
   (d) at least one axially extending plastic arm having a flexible fulcrum positioned between the extremities of the arm and integral with both the arm and the central body portion with the arm being radially spaced from the outer surface of the central body portion and having a first portion extending axially to overlie a portion of the other connector in assembly, and a second portion extending axially in a direction opposite to said first portion, said second portion being substantially parallel with the longitudinal axis of said central body portion, said arm, fulcrum, central body portion and the two ends of the connectors being a one-piece connector, and
   (e) engaging means at the overlying end of the first portion of the arm to mechanically engage a portion of the other connector in assembly in one position to prevent axial disengagement of the connectors, each arm being flexible at its fulcrum to move the engaging means radially outward within the inherent resiliency of the integral fulcrum to a disengaging position when a radially inward pressure is applied to the second portion of the arm in the area between the end of the arm opposite the engaging means and the integral fulcrum located between the extremities of the arm.

References Cited

UNITED STATES PATENTS

| | | |
|---|---|---|
| 1,043,683 | 11/1912 | Fieser. |
| 1,384,332 | 7/1921 | Mullenux _____ 285—320 |
| 2,235,020 | 3/1941 | Jones _____ 339—61 |
| 3,133,777 | 5/1964 | Anhalt. |
| 3,245,703 | 4/1966 | Manly _____ 285—319 |

FOREIGN PATENTS

| | | |
|---|---|---|
| 684,125 | 11/1939 | Germany. |
| 641,315 | 8/1950 | Great Britain. |

EDWARD C. ALLEN, *Primary Examiner.*

THOMAS F. CALLAGHAN, *Assistant Examiner.*